Patented Mar. 27, 1934

1,952,125

UNITED STATES PATENT OFFICE 1,952,125

MANUFACTURE OF ESTERS

Karl R. Edlund, Berkeley, Calif., assignor to Shell Development Company, San Francisco, Calif., a corporation of Delaware No Drawing. Application April 22, 1932, Serial No. 607,013

13 Claims. (Cl. 260—106)

This invention relates to the esterification of any alcohol, other than tertiary, which forms a ternary azeotrope with its ester and water and more particularly is concerned with the esterification of primary and secondary aliphatic alcohols, especially secondary alcohols containing more than three carbon atoms to the molecule, in the presence of an excess of esterification agent over the theoretical amount of alcohol.

In one course of procedure, according to prior art, it has been customary to distill off a mixture of ester, alcohol and water as a constant boiling mixture from a still charge comprising alcohol, acid and water. This constant boiling mixture or ternary azeotrope is then condensed and separates into two phases at room temperature. The lower aqueous phase comprising about 95% water with small amounts of alcohol and ester is either run to waste or utilized to recover its alcohol and/or ester values. The upper phase, neutralized and/or water-washed free of traces of acid is fractionated to remove dissolved water as the ternary azeotrope, usually obtaining as a final product a mixture of ester and alcohol containing considerably less ester than desirable for use in the arts, as lacquer solvents, for example. Since the secondary alcohols in question particularly do not form a binary azeotrope with their esters, enrichment by removal of binary alcohol-ester azeotrope is inapplicable here. In cases where the binary azeotrope does exist with certain alcohols, enrichment by removal of binary alcohol-ester azeotrope would tend to be difficult due to the difficulty of its separation from excess ester.

I have discovered that by maintaining a moderate excess of acid in the still charge containing alcohol and a relatively small amount of esterification catalyst, the reactants preferably added in the substantially anhydrous state, reacting the mixture to equilibrium and shifting said equilibrium toward the ester side by withdrawal of a part of the water formed in the esterification of the still charge before the feed mixture is introduced, that the effect is to produce a still charge containing a preponderance of ester, a moderate excess of acid over unreacted alcohol and a small proportion of water. When the desired ester concentration has been attained in the still charge, the mixture is distilled while introducing the feed mixture of alcohol and acid, with or without water. The vapors leaving the column may be considered as a mixture of the ternary ester-alcohol-water and binary ester-water azeotropes, together with a small amount of the organic acid. The ratio of ester to alcohol in the distillate is higher than that prevailing in the ternary ester-alcohol-water azeotrope, while the aqueous content of the former is usually substantially the same as that of the ternary azeotrope. For convenience, this mixture is designated as "tertrope". The "tertrope" or distillate is condensed and stratified. A portion of the upper or ester phase is withdrawn as crude product, the balance returning to the still as reflux. In the limiting case where substantially anhydrous reactants are being fed into the still, the portion of the lower (aqueous) phase withdrawn corresponds stoichiometrically to the quantity of ester withdrawn from the upper phase. The remainder of the lower phase also returns as reflux. It is seen that, in the cases where the "tertrope" contains more than the stoichiometrical proportion of water to ester, the combined reflux has a higher water content than the vapors, thus exerting a scrubbing action which tends to reduce the acidity of the product still further.

If water be added to the feed so that the latter contains acid, alcohol and water equivalent to the mixture of binary and ternary azeotropes or "tertrope", then the upper and lower phases are withdrawn in the proportions present in the distillate, the remainder of the phases returning as reflux.

It would also be possible to utilize as feed to the still an acid-alcohol mixture containing water in higher than "tertrope"-forming proportions. This might be desirable in cases where dilute acid and/or alcohol were available cheaply. In this case, excess water layer relative to the proportion of the upper phase withdrawn would be removed.

In the case of the esterification of alcohols whose ester-alcohol-water distillate contains less than the stoichiometrical proportion of water, I nevertheless can withdraw from the separator water and ester in stoichiometrical proportions while feeding substantially anhydrous reactants to the still. The reflux, in this case, contains a higher proportion of ester than that prevailing in the distillate. It is clear that in this case, substantially anhydrous feed materials are preferable, since more than sufficient water for "tertrope" formation is continuously produced from the substantially anhydrous feed materials while reacting in the still.

The point in all the above cases is that the feed and the two phases of products removed should be adjusted so that no change in composition or volume of the still contents results.

A limiting factor in the choice of reaction mixture is the chemical equilibrium. As the reaction approaches equilibrium, the esterification rate approaches zero; the nearer to equilibrium one chooses to operate, therefore, the greater the bulk of reacting materials must be to permit a given rate of ester production.

Under steady conditions, the rate of removal of ester by distillation must equal the rate of production in the still charge. The latter is the product of the specific reaction rate and the total volume of reacting materials in the still. Accordingly, for any desired output of ester, low reaction rate may be compensated by a large bulk of reactants; it may thus, for example, be possible to operate closely to chemical equilibrium where the rate by definition approaches zero.

The concentrations of acid and alcohol decrease and that of ester increases, the closer equilibrium is approached, making the removal by fractionation of a distillate of given ester content increasingly less difficult.

By allowing the mixture to come to equilibrium and/or by shifting it toward the ester side and taking off distillate from the resulting still charge mixture thereby going back to a point where the rate of ester formation of determined by the still charge and specific reaction rate at that point just equals the rate of removal of ester, and adjusting the feed to compensate for the distillate withdrawn, it is possible to obtain the required distillate from a still charge containing any amount of excess acid.

The percentage of ester in the product is controlled by the composition of the still charge—the ester:alcohol ratio in the product varying with that of the still charge. The acidity of the product is kept below the preferable maximum limit of 0.5% by control of the acidity of the still charge and reflux ratio.

I have found in the case of secondary butanol and acetic acid that an initial acid:alcohol molal ratio of about 1.5:1 in the still charge is to be preferred. Such a mixture should preferably be reacted to an equilibrium where approximately 3% of water is present, by appropriate removal of water; this is accomplished by removing the necessary amount of lower layer of distillate while the still is running under otherwise total reflux. Thus, the adverse effect of water on the esterification equilibrium is minimized and the absence of sufficient water to form mixed azeotrope or "tertrope" with all the ester and alcohol in the still as set forth in my copending application, Serial No. 567,989, filed October 9, 1931, is offset by having a heavy preponderance of ester rather than acid present in the still.

A typical analysis of the still charge at the above described equilibrium when starting with an initial charge of acetic acid and secondary butanol in the molal ratio of 1.5:1 is: Secondary butyl acetate 62.3%; acetic acid 27.3%; secondary butanol 7.3% and water 3.1%. The molal ratio of acid to alcohol in this equilibrium charge is accordingly 4.6:1.

Water could be withdrawn even further; if from a 1.5:1 starting mixture, water was withdrawn until at equilibrium there were: $H_2O$ 1.0%, alcohol 3.3%, acid 22.9% and ester 72.8%, the molal ratio of acid to alcohol would be 8.6:1.

If all water were removed, the still charge from a 1.5:1 starting mixture would have the composition: Ester 79.5%, acid 20.5%, the molal ratio of acid to alcohol being infinite. In this case, the only water in the still to contribute to the formation of the mixed azeotrope distillate or "tertrope" would be that introduced, actually or potentially, with the continuous feed. The throughput is decreased by one-half or more under these conditions, even if water be added to the feed in "tertropic" proportion.

When operating with an anhydrous feed, the water in the still charge should not be substantially less than 3%.

The initial still charge ratios may be greater than 2:1 or may approach the stoichiometric, acetic acid always being kept in excess. However, precautions must be exercised as the former if reacted to completion gives a high percentage of acid in the still charge, which, though permitting a higher reaction rate per unit volume of still charge, increases the difficulty of fractionation proportionately. On the other hand a low ratio if reacted to completion would give a still charge containing a low percentage of acid which would lend itself to ready fractionation. However, the specific reaction rate would be low, requiring a very large still charge.

The upper or ester phase, removed from the system, is distilled, water being easily removed as a component of the ternary ester-alcohol-water azeotrope, yielding without intensive fractionation an ester-alcohol product well above the prevailing specification minimum of ester.

Employment of an excess of alcohol rather than acid in the still is out of the question; in that case, the most favorable distillate obtainable would be the ternary azeotrope.

A practical limitation upon the excess of acid is imposed by the fact that the difficulty of fractionation increases in proportion. A precaution to be observed is to control the reflux ratio so that the acidity of the distillate is low for economic reasons, in the present case conveniently being below 0.5%.

While I have described my invention in connection with the manufacture of secondary butyl acetate, it is capable of being employed with other secondary alcohols, such as secondary amyl alcohols, secondary hexyl alcohols and the like as well as with primary alcohols of the $C_nH_{2n+1}OH$ type. Esters different from the acetates may be prepared as the operating procedure is similar with butyric, propionic, formic, caproic acids, and the like.

The process can be conducted in a batch, intermittent or continuous manner. A still charge of excess acetic acid and secondary butanol is allowed to react substantially to equilibrium. A suitable catalyst is present with the esterification components. This may be any strongly ionizable acid in small amount, for instance sulfuric acid is convenient. Other suitable catalysts are hydrochloric acid, phosphoric acid, the sulfonic acids of benzene and its homologues, bisulfates, and the like. The mixture, in a still fitted with a suitable fractionating column, is subjected to distillation. When operating continuously, a mixture of acetic acid and secondary butanol, with or without water, in suitable proportions, is continuously fed into the still as distillate is removed. The continuous feed to the still consists of the reactants in the proportions and at a rate to compensate for the crude ester withdrawn. Since I do not attempt to operate with such an excess of acetic acid in the still that the product is practically pure ester, it is necessary that the feed contain an excess of alcohol. The acidity of the distillate should not rise too high, for economic reasons and is conveniently held below 0.5%. The distillate is condensed and allowed to stratify into two phases. The desired proportion of the upper or ester phase is neutralized with cold caustic or alkali-metal carbonate solution or the like and/or water-washed free from acid, the remainder returning as reflux with the balance of the lower aqueous phase (from which has been removed a portion relative to the feed and to the portion of upper phase removed as product). The acid-free portion is then fractionated to remove the dissolved water therein as ternary azeotrope, obtaining as final product a mixture of ester and alcohol containing more than 85% ester. If desired, the ester can be recovered substantially 100% pure by distilling the mixture of ester and alcohol with the proper amount of water to form a ternary alcohol-ester-water azeotrope of all the alcohol present, or the water can be added to the acid-free layer prior to distillation.

The ternary azeotrope removed from the upper portion separates also into two phases. The upper phase can either be dehydrated and utilized as such i. e., as secondary butyl acetate containing alcohol in amounts greater than that of existing specification or be returned to the esterification still, due allowance being made therefor as part of the continuous feed.

The ester and alcohol values of the lower layers can be partially recovered by using them as sources of water and alcohol for the feed mixture or be recovered by methods well known in the art.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. A process for making esters which comprises reacting a still charge of excess aliphatic monocarboxylic acid and aliphatic monohydric alcohol substantially to equilibrium, shifting the equilibrium toward the ester side by distillation and withdrawal of a part of the water formed in the esterification of the still charge while otherwise operating under total reflux, removing a predetermined amount of distillate and feeding in a mixture comprising said acid and alcohol corresponding to the distillate withdrawn.

2. A process for making esters which comprises reacting a still charge of excess aliphatic monocarboxylic acid and aliphatic monohydric alcohol substantially to equilibrium, shifting the equilibrium toward the ester side by distillation and withdrawal of a part of the water formed in the esterification of the still charge while otherwise operating under total reflux, removing a predetermined amount of distillate, feeding in a mixture comprising said acid and alcohol corresponding to the distillate withdrawn and returning as reflux portions of both phases resulting from the condensation of the distillate.

3. A process for continuously making esters which comprises reacting a still charge of excess aliphatic monocarboxylic acid and aliphatic monohydric alcohol substantially to equilibrium, shifting the equilibrium toward the ester side by distillation and withdrawal of a part of the water formed in the esterification of the still charge while otherwise operating under total reflux, removing a predetermined amount of distillate and maintaining the resultant still charge composition substantially constant by continuously feeding in a mixture comprising said acid and alcohol corresponding to the distillate withdrawn.

4. A process for making esters which comprises reacting a substantially anhydrous still charge of excess aliphatic monocarboxylic acid and aliphatic monohydric alcohol substantially to equilibrium, shifting the equilibrium toward the ester side by distillation and withdrawal of a part of the water formed in the esterification of the still charge while otherwise operating under total reflux, removing a predetermined amount of distillate and feeding in a mixture comprising said acid and alcohol corresponding to the distillate withdrawn.

5. A process for making esters which comprises reacting a still charge of excess aliphatic monocarboxylic acid and a secondary aliphatic monohydric alcohol substantially to equilibrium, shifting the equilibrium toward the ester side by withdrawal of a part of the water formed in the esterification of the still charge while otherwise operating under total reflux, removing a predetermined amount of distillate and feeding in a mixture comprising said acid and alcohol corresponding to the distillate withdrawn.

6. A process for making esters, comprising maintaining substantially constant in composition a still charge containing a preponderance of ester corresponding to the fatty acid and aliphatic monohydric alcohol employed, a moderate excess of aliphatic monocarboxylic acid over unreacted aliphatic monohydric alcohol and a small proportion of water during distillation by feeding in a mixture comprising said acid and alcohol corresponding to the distillate withdrawn.

7. A process for making esters, comprising maintaining substantially constant in composition a still charge containing a preponderance of ester corresponding to the fatty acid and aliphatic monohydric alcohol employed, a moderate excess of aliphatic monocarboxylic acid over unreacted aliphatic monohydric alcohol and not substantially less than 3% water during distillation by feeding in a mixture comprising said acid and alcohol corresponding to the distillate withdrawn.

8. A process for making esters, comprising maintaining substantially constant in composition a still charge containing a preponderance of ester corresponding to the fatty acid and aliphatic monohydric alcohol employed, a moderate excess of aliphatic monocarboxylic acid over unreacted secondary aliphatic monohydric alcohol, and a small proportion of water during distillation by feeding in a mixture comprising said acid and alcohol corresponding to the distillate withdrawn.

9. A process for making esters, comprising maintaining substantially constant in composition a still charge containing a preponderance of ester corresponding to the fatty acid and eliphatic monohydric alcohol employed, a moderate excess of aliphatic monocarboxylic acid over unreacted secondary aliphatic monohydric alcohol and not substantially less than 3% water during distillation by feeding in a mixture comprising said acid and alcohol corresponding to the distillate withdrawn.

10. A process for making esters, comprising maintaining substantially constant in composition a still charge containing a preponderance of secondary butyl ester, a moderate excess of aliphatic monocarboxylic acid over unreacted secondary butyl alcohol and a small proportion of water during distillation by feeding in a mixture comprising said acid and alcohol corresponding to the distillate withdrawn.

11. A process for making esters, comprising maintaining substantially constant in composition a still charge containing a preponderance of secondary butyl ester, a moderate excess of aliphatic monocarboxylic acid over unreacted secondary butyl alcohol and not substantially less than 3% water during distillation by feeding in a mixture comprising said acid and alcohol corresponding to the distillate withdrawn.

12. A process for making esters, comprising maintaining substantially constant in composition a still charge containing a preponderance of secondary amyl ester, a moderate excess of aliphatic monocarboxylic acid over unreacted secondary amyl alcohol and a small proportion of water during distillation by feeding in a mixture comprising said acid and alcohol corresponding to the distillate withdrawn.

13. A process for making esters, comprising maintaining substantially constant in composition a still charge containing a preponderance of secondary amyl ester, a moderate excess of aliphatic monocarboxylic acid over unreacted secondary amyl alcohol and not substantially less than 3% water during distillation by feeding in a mixture comprising said acid and alcohol corresponding to the distillate withdrawn.

KARL R. EDLUND.